US009687800B2

(12) United States Patent
Gueller et al.

(10) Patent No.: US 9,687,800 B2
(45) Date of Patent: Jun. 27, 2017

(54) SUBSTANCE CONTAINER FOR A CHEMICAL REACTION

(75) Inventors: Rolf Gueller, Herznach (CH); Daniel Juchli, Kaiseraugst (CH); Michael Schneider, Frick (CH); Annie Schnyder, Hersberg (CH)

(73) Assignee: Chemspeed Technologies AG, Füllinsdorf (CH)

( * ) Notice: Subject to any disclaimer, the term of this patent is extended or adjusted under 35 U.S.C. 154(b) by 673 days.

(21) Appl. No.: 13/883,865

(22) PCT Filed: Nov. 7, 2011

(86) PCT No.: PCT/CH2011/000266
§ 371 (c)(1),
(2), (4) Date: Jul. 23, 2013

(87) PCT Pub. No.: WO2012/061946
PCT Pub. Date: May 18, 2012

(65) Prior Publication Data
US 2013/0296508 A1     Nov. 7, 2013

(30) Foreign Application Priority Data

Nov. 8, 2010    (CH) ...................................... 1865/10

(51) Int. Cl.
*B01J 8/00*     (2006.01)
*B01J 4/02*     (2006.01)
(Continued)

(52) U.S. Cl.
CPC .......... *B01J 8/0015* (2013.01); *B01F 15/0206* (2013.01); *B01F 15/0224* (2013.01);
(Continued)

(58) Field of Classification Search
CPC .......... B01J 4/02; B01J 8/0015; B01J 19/245; B01F 15/0206; B01F 15/150224
USPC ............................. 526/78; 422/547, 559, 549
See application file for complete search history.

(56) References Cited

U.S. PATENT DOCUMENTS

2002/0119220 A1*  8/2002  Costello .................. A23B 4/16
                                                          426/111
2003/0012690 A1   1/2003  Taylor et al.
(Continued)

FOREIGN PATENT DOCUMENTS

DE    102005059000 A1   6/2007
GB        2332882 A     7/1999
(Continued)

OTHER PUBLICATIONS

Esser-Kahn et al., "Triggered Release from Polymer Capsules", Macromolecules, 2011, pp. 5539-5546, vol. 44.
(Continued)

*Primary Examiner* — Fred M Teskin
(74) *Attorney, Agent, or Firm* — The Webb Law Firm

(57) ABSTRACT

Disclosed is a method for carrying out a chemical reaction in a reactor, at least one substance is present in a container that is closed in a gas-tight manner, is introduced into the reactor in said container and is released by breaking open the container. The container is designed such that it breaks open when a specified bursting pressure difference between the internal pressure and external pressure is exceeded. The container is broken open and the substance located in the container is thus released as a result of deliberate application in the reactor of a pressure difference exceeding the bursting pressure difference.

19 Claims, 8 Drawing Sheets

(51) Int. Cl.
  *B01J 19/00* (2006.01)
  *B01F 15/02* (2006.01)
  *B01J 19/24* (2006.01)

(52) U.S. Cl.
  CPC ............ *B01J 4/02* (2013.01); *B01J 19/0006* (2013.01); *B01J 19/245* (2013.01); *B01J 19/2445* (2013.01); *B01J 2204/002* (2013.01); *B01J 2219/0072* (2013.01); *B01J 2219/00162* (2013.01); *B01J 2219/00272* (2013.01); *B01J 2219/00301* (2013.01); *B01J 2219/00418* (2013.01); *B01J 2219/00585* (2013.01); *B01J 2219/00592* (2013.01); *B01J 2219/00736* (2013.01)

(56) References Cited

U.S. PATENT DOCUMENTS

| | | |
|---|---|---|
| 2004/0235046 A1 | 11/2004 | Gueller et al. |
| 2011/0062036 A1 | 3/2011 | Xie et al. |

FOREIGN PATENT DOCUMENTS

| | | |
|---|---|---|
| WO | 0213969 A1 | 2/2002 |
| WO | 0243854 A2 | 6/2002 |
| WO | 2004014543 A1 | 2/2004 |

OTHER PUBLICATIONS

Keller et al., "Mechanical Properties of Microcapsules Used in a Self-Healing Polymer", Experimental Mechanics, 2006, pp. 725-733, vol. 46.

Mathiowitz et al., "Polyamide Microcapsules for Controlled Release. II. Release Characteristics of the Microcapsules", Journal of Membrane Science, 1989, pp. 27-41, vol. 40.

Van Oordt et al., "Miniature Stick-Packaging—An Industrial Technology for Pre-Storage and Release of Reagents in Lab-On-A-Chip Systems", Oct. 2-6, 2011, 15th International Conference on Miniaturized Systems for Chemistry and Life Sciences, Seattle, Washington, USA.

* cited by examiner

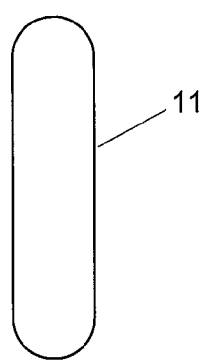 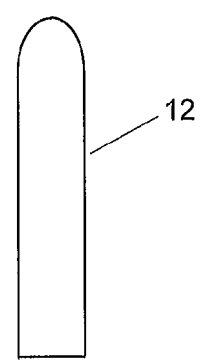 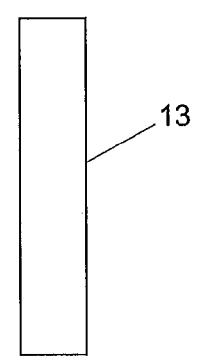 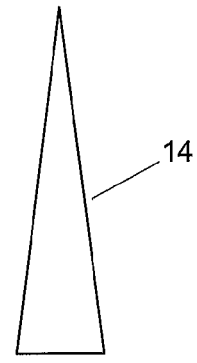
Fig. 4a        Fig. 4b        Fig. 4c        Fig. 4d
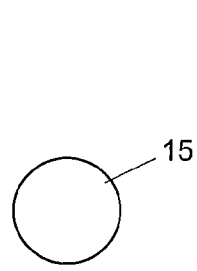 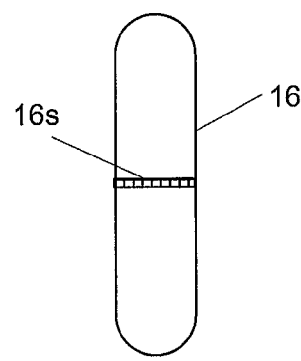 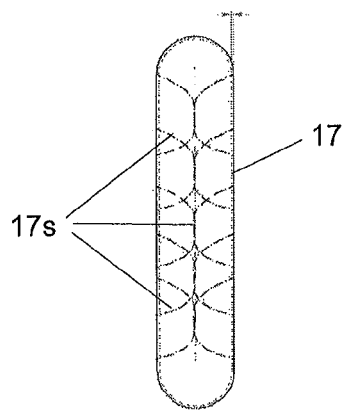
Fig. 4e        Fig. 4f        Fig. 4g

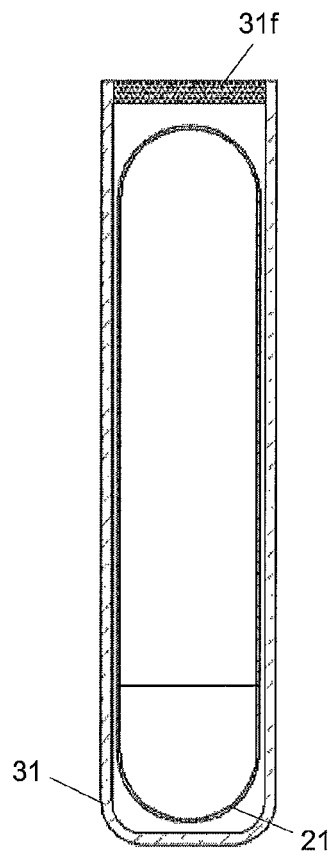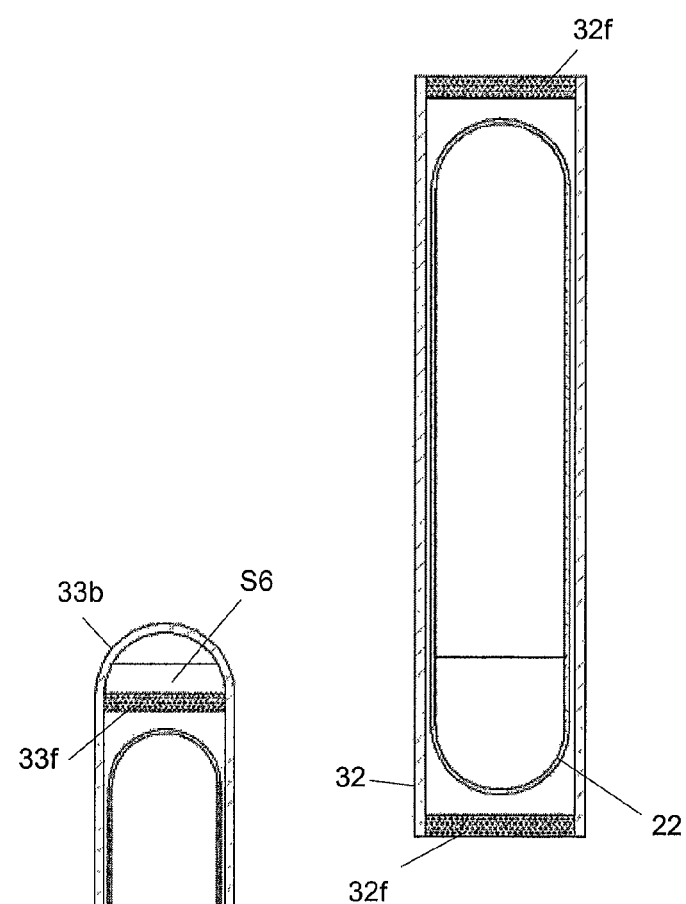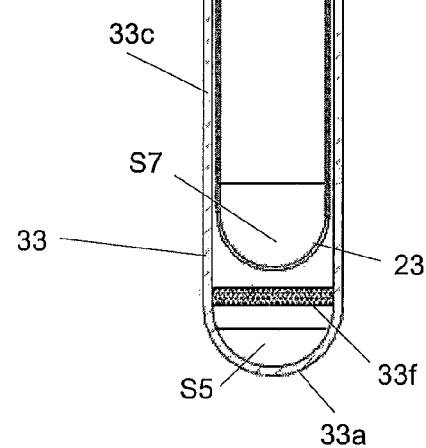
Fig. 6a
Fig. 6b
Fig. 6c

US 9,687,800 B2

SUBSTANCE CONTAINER FOR A CHEMICAL REACTION

CROSS REFERENCE TO RELATED APPLICATIONS

This application is the United States national phase under 35 U.S.C. §371 of International Application No. PCT/CH2011/000266 filed Nov. 7, 2011, entitled "Substance Container for a Chemical Reaction", and claims priority under 35 U.S.C. §119(a)-(d) to Switzerland Patent Application No. 1865/10 filed on Nov. 8, 2010 in the Switzerland Intellectual Property Office, the disclosures of which are hereby incorporated by reference in their entirety.

BACKGROUND OF THE INVENTION

Field of the Invention

The invention relates to a method for carrying out a chemical reaction by reacting two or more substances in a container, a container for carrying out the reaction, a set of such containers, and the use of such a container for stopping a chemical reaction.

Description of Related Art

A method for carrying out a chemical reaction by reacting two or more substances in a reactor is described in WO 02/13969 A1 (and the corresponding document US 2004/0235046 A1), in which at least one of the substances required for the reaction is present in a container that is closed in a gas-tight manner, is introduced in or with said container into the reactor, and is released from the container by breaking open the container either before the reaction or during the reaction. Here, the containers are broken open within the reactor by untargeted application of a chemical, physical or mechanical influence, typically for example by the impact effect of a stirrer provided in the reactor. Furthermore, the pressure prevailing in the reactor may also cause the substance containers to break open. In the case of the method in WO 02/13969 A1, a set of substance containers are used, which each contain substance quantities graduated based on mole equivalents. The use of such containers pre-filled with substance quantities graduated based on mole equivalents facilitates for the laboratory chemist the correct metered addition of the substances necessary for the respective reaction, and/or makes it possible with pre-filled substance quantities to "handle" a necessary substance quantity. This is of great significance, in particular when carrying out parallel reactions.

With many chemical reactions, relatively small and minimal substance quantities often have to be introduced during the course of the reaction into the reaction mass located in the reactor at precisely determined moments in time or once a precisely defined physical state, for example pressure, is reached. If there is a relatively high pressure in the reactor at this moment in time, the introduction of the substance requires extremely complex and accordingly cost-intensive equipment. A further frequent problem is also that the substances to be introduced are often very sensitive and for example must not come into contact with air or moisture. On the other hand, certain catalysts in polyolefin synthesis for example can only be added once a precisely determined pressure (for example ethylene gas pressure) of the reaction mixture is reached. This again significantly increases the complexity of the equipment required for the metered addition of such substances. In the field of polyolefin synthesis, a very small quantity for example, typically 0.6 mg for example, of a highly sensitive catalyst in a suspension has to be pumped by means of a high-pressure pump with absolute air and moisture exclusion into a reactor typically having a volume of 100-1000 ml or even greater, typically against 30 bar of pressure. A further even more serious problem is that, with the very active catalysts available nowadays, for example in the case of heterogeneous catalysis, it is virtually impossible to meter extremely small catalyst quantities in a suspension into a reactor against a high pressure, for example of 60 bar, without the few suspended catalyst particles becoming lost or destroyed as a result of the practically unavoidable residual moisture or residual air in the complex, generally confusing lines before they have reached the reactor. If in addition, as is conventional, sensitive co-catalysts and if necessary further reagents are added, the metered addition under pressure is even more problematic.

Many chemical reactions require the addition of specific substances during a specific phase of the course of the reaction. In practice, this means that the reactor has to be made accessible for the substance feed, which, with a pressurised reactor, of course necessitates specific technically complex dosing equipment that is difficult to clean of residual air or residual water (pressure pumps, hoses, etc.). Even with a high level of technical complexity, it is practically impossible to add the substances in pure, for example solid, form. This alone would open up new possibilities however and would therefore be particularly desirable.

A further problem exists when carrying out what are known as parallel reactions using a plurality of reactors. If the reactions require the metered addition of minimal quantities of highly sensitive substances, in particular against high reactor pressures, the complexity of the equipment required increases enormously. A further problem generally exists when carrying out any parallel experiments, in particular with short and medium reaction times. It is precisely this however that is the most interesting part for parallel synthesis for example. In practice, such reactions can then only be carried out in a pseudo-parallel manner, that is to say the substances are metered sequentially, such that the complexity of the equipment required remains within reasonable limits. For example, if the reaction time is 10 minutes and the metered addition of a substance requires one minute, the first reactor has to be treated further, that is to say supplied with a further substance, at the latest as the substance is metered into the tenth reactor. Here, there is often the difficulty that the reaction taking place in a reactor already requires the metered addition of a substance whilst the piece of equipment provided for this purpose is still blocked by another reactor. For a pipetting robot for example, this is practically impossible to solve without enormous technical effort. This problem can indeed be mitigated in part by what is known as "scheduling" with the aid of highly complex software algorithms, but in practice cannot be solved satisfactorily.

It is therefore desirable to have a simple solution, with which, with the simplest software and the simplest hardware, all reactions could be handled at the same time, particularly for example so as to be able to add a desired substance to any reaction for example at any desired moment in time, for example even at the same moment in time in all reactions. This would provide a technical breakthrough, not only for parallel synthesis, but also for experiments carried out conventionally. Document WO 02/13969 A1, as cited in the introduction, primarily concerns the provision of substance containers, which each contain substance quantities graduated based on mole equivalents, as already mentioned. The above-explained problem when metering particularly delicate substances is not addressed in any way in this document. Furthermore, no solution approach for this problem can be found either explicitly or inexplicitly in this document. In addition, this document does not disclose a solution for the problem of "scheduling". In addition, this document also does not describe that a reaction could be completely prepared such that it (or possibly also merely parts thereof) could be carried out in a "remote-controlled" manner so to speak.

A method and a device suitable therefor for producing mixtures formed of at least three components are described in DE 10 2005 059 000 A1. The device comprises a flask-shaped mixing vessel, in which one of the mixing components is located. A two-chamber inner container is inserted and fixed in an opening neck of the mixing vessel. The two chambers of the inner container are separated by a separating diaphragm that can be broken open and each contains one of the two other mixing components. A rotatable closure cap sits on the opening neck of the mixing vessel. The inner container is closed at the bottom, that is to say toward the interior of the mixing vessel, by a rupture disc. Toward the top, the inner container is closed only indirectly via the closure cap of the mixing vessel. The closure cap is coupled mechanically and/or kinematically to a rod protruding into the inner container and standing up on the diaphragm. By rotating the closure cap, the rod is pressed inwardly and the separating diaphragm is thus broken open, wherein the two mixing components located in the inner container are mixed and react with one another. During the mixing and/or reaction of the two components, an increased pressure is produced in the inner container as a result of gas development and breaks open the rupture disc at the lower end of the inner container, such that the contents of the substance container pour out into the mixing vessel and mix with the mixing component located there. With the device disclosed in this document and/or the mixing method disclosed therein, the mixing process is triggered by a manual, mechanical force effect on and the resultant breaking open of the separating diaphragm between the two chambers of the inner container. The inner container is fixed against movement in the mixing vessel and is not closed in a gas-tight manner on its own.

SUMMARY OF THE INVENTION

On the basis of the problem explained above, a first object of the invention is to simplify the metered addition of substances necessary for the reaction and, in extreme cases, to make this possible for the first time. A further object of the invention is to improve a method of the generic type to such an extent that it is suitable for carrying out real parallel reactions. Lastly, a method of the generic type is to be improved by the invention to such an extent that the addition even of highly sensitive substances and in particular minimal amounts thereof can be initiated at any desired moment in time over the course of the reaction using simple means, without having to open the reactor for this purpose.

These objects forming the basis of the invention are achieved by the method according to the invention, by the container according to the invention, and by the set of containers according to the invention.

In terms of the method according to the invention, the essence of the invention is as follows: With a method for carrying out a chemical reaction by reacting two or more substances in a reactor, at least one substance is present in a substantially reaction-inert container that is closed in a gas-tight manner, is introduced into the reactor in said container, and is then only released from the container either before or during the reaction by deliberately breaking open the container. A container is used that is formed such that it breaks open when a specified bursting pressure difference between the internal pressure and the pressure outside the container is exceeded. The container is broken open and therefore the substance located in the container is released as a result of deliberate application in the reactor of a pressure, at which the difference between the pressure in the reactor and the pressure in the container exceeds the specified bursting pressure difference of the container.

In terms of the container according to the invention, the essence of the invention is as follows: A container that is closed in a gas-tight manner and contains a measured quantity of a chemical substance is designed for a specified bursting pressure difference between the internal pressure and the pressure outside the container, such that, when a pressure difference exceeding the specified bursting pressure difference is present between the internal pressure and the pressure outside the container, said container breaks open and releases the substance contained therein.

In terms of the set of containers according to the invention, the essence of the invention is as follows: With a set of at least two containers that are closed in a gas-tight manner and each contain a measured quantity of a chemical substance, each container is designed for a specified bursting pressure difference between the internal pressure and the pressure outside the container, such that, when a pressure difference exceeding the specified bursting pressure difference is present between the internal pressure and the pressure outside the container, said container breaks open and releases the substance contained therein.

In the present context, the term "substance" or "substances" is not only understood to mean the starting materials involved in the reaction, but also such materials that have an indirect influence or even no influence or only a potential influence on the stoichiometry of the reaction product to be formed or that are to be fed for any other reason, such as solvents, catalysts, co-catalysts, activators, inhibitors, accelerators, etc. The substances can be solid, liquid or gaseous, and solutions and suspensions are also possible. The physical and chemical conditions under which the substances are combined in the reactor until the desired reaction product is formed are referred to as the reaction conditions.

In the present context, the expression "substantially reaction-inert" is to be understood to mean that the material or the materials of which the container consists has or have no influence or at least no considerable influence on the chemical reaction. Materials such as glass or polyethylene are known as suitable for most reactions.

In the present context, the expression "specified bursting pressure difference" is to be understood to mean a pressure difference value between the internal pressure of the container and the outer pressure prevailing outside the container, the container bursting or breaking open when said pressure difference value is present or exceeded, such that the contents of said container are released or accessible. Each container is designed for a specified bursting pressure difference, that is to say for a bursting pressure difference preselected by the manufacturer, which can be achieved during manufacture by means of material selection, wall thicknesses, shaping and/or formation of predetermined breaking points. In addition, the term "specified" means that the bursting pressure difference of any container is known or has to be made known to the user in any form, such that the containers can be used correctly in accordance with their bursting pressure difference or the execution of the reaction can be adapted accordingly. The information concerning the specified bursting pressure difference has to be assigned to the container in a suitable form. For example, information concerning the specified bursting pressure difference can be attached to the containers themselves, for example as a marking in the form of a code or plain text. Alternatively, the information concerning the bursting pressure difference of a container may also be attached to a container packaging or may be provided on another information carrier, for example in the container packaging. It is merely essential that the user can clearly identify the bursting pressure difference for which the respective container is designed.

In the present context, the expression "deliberate application of a pressure difference" in the reactor is to be understood to mean the deliberate generation of a pressure in the reactor that is higher or lower than the internal pressure of a container located in the reactor. Here, this is typically a higher pressure (overpressure), but in principle the application of negative pressure (vacuum) is also possible. It is also possible for example for the containers to be closed under pressure. Containers closed in this way (and therefore pressurised) burst under otherwise identical conditions with a higher external pressure or for example (more likely) burst with an external negative pressure. The pressure values mentioned by way of example in the following embodiments are absolute pressure values, and the corresponding pressure difference values with respect to the internal pressures of the containers are given by deduction of the internal pressures. The latter correspond in most cases to the normal air pressure.

The deliberate generation of a specific pressure in the reactor is typically achieved by applying a gas or gas mixture under corresponding pressure to the reactor with the use of appropriate equipment known per se, wherein the gas or gas mixture is inert or, where necessary, may also be involved in the reaction. If the applied pressure in this reaction phase is not in any case necessary for the reaction, a relatively short-term application is adequate, which is sufficient to selectively break open the desired container (or all containers designed for the same bursting pressure difference). The deliberate pressure generation may also utilise or include a (autogenous) pressure created in the reactor by the reaction itself however, wherein the reaction kinetics has of course to be known and the bursting pressure difference of the container has to be accordingly adapted thereto. The (over) pressure in the reactor necessary to reach the specified bursting pressure difference of the container can also be generated for example by optional temporary deliberate heating of the reaction mass, for example when external pressure application by means of a gas is not provided or possible.

In accordance with the primary idea of the method according to the invention, the substance or substances is/are metered and/or released in a pressure-induced manner, that is to say by deliberate application in the reactor of a pressure matched to the specified bursting pressure difference of the container(s) containing the substance or substances, the difference with respect to the pressure in the container exceeding the specified bursting pressure difference of the container at the aforementioned pressure in the reactor. This method has the advantage that the substances to be metered can be introduced into the reactor already before the start of the reaction (within the containers that are still closed), where they can then be held until they are required during the course of the reaction. Due to the use of substance containers, in which the substances are enclosed in a gas-tight manner, the metered addition of minimal substance quantities and also the metered addition of highly sensitive substances is also possible in a fully unproblematic manner. Due to the pressure-induced release of the substances, the course of the reaction can be "remote-controlled" externally to a certain extent in the simplest of manners merely by production of the necessary pressure conditions, but without other interventions in the reactor.

In this respect, the method according to the invention has a further important advantage since it enables real parallel reactions to be carried out in a practically unlimited number of reactors without high complexity of the required equipment. All substances necessary for the reactions can be introduced into the reactors already before the start, and the metered addition of individual substances at the onset of the reactions or at a later moment in time over the course of the reaction can be controlled very easily by generating accordingly matched pressure conditions or pressure profiles in the individual reactors.

Furthermore, for example the "quality control" with regard to quantity (the quantity of reagent to be metered) and quality can be completely decoupled from the reaction and implemented beforehand.

Furthermore, what are known as "libraries" of reagents and components can be applied in such a way that practically "remote-controlled" reactions can be carried out automatically for the first time in specific areas from planning to execution, more specifically with less complex equipment compared to today's equipment ("desktop chemistry").

In a general synthesis, for example parallel synthesis, the increased external pressure, for example with an inert gas, for example argon, is in the first instance generated in a first phase merely so that all reagents, for example in ten reactors, are released simultaneously so that the reactions all start at the same moment in time. At a later moment in time, the pressure is then brought to a higher stage, at which a container then breaks open in each reactor, said container containing a substance that stops the respective reaction, wherein all reactions are then stopped simultaneously. In this simple example, the problem of "scheduling" is not only solved, but is completely eliminated.

In a specific reaction, such as polyolefin synthesis, all reagents are added into inert containers according to the invention, such that for example the container containing a co-catalyst (for example MAO), releases the substance or the co-catalyst for example at an ethylene gas pressure (reactive gas pressure) of 10 bar. The catalyst is added to the reactor, before the start of the synthesis, in a container, which for example bursts at 30 bar ethylene gas pressure and releases the catalyst. The catalyst is therefore indeed present from the start in the substance mixture in a manner in which it can be dissolved in a technically simple manner, but is released neither at the start of the reaction, nor at 10 bar ethylene gas pressure, where the co-catalyst is released, but is reliably separated from the other reaction partners by means of the container, that is to say to a certain extent an inert "packaging", until the moment in time at which the pressure increases to 30 bar. In a further reaction step, a monomer other than the reaction gas molecule ethylene is to be incorporated into the polymer chain, for example at a specific moment in time. To this end, a precisely defined quantity of butadiene for example is also added in a container according to the invention either at the onset of the reaction or before the onset of the reaction, said container bursting for example at 40 bar ethylene gas pressure and thus releasing the substance contained therein. Any reagent can thus be introduced into the reaction at practically any moment in time, although deliberately, for example without having to open the reactor or without other significant technical precautions. Furthermore, the quality control (for example with regard to dosing quantities) can be decoupled from the reaction, which provides further advantages. A container with gas, for example propylene, can also be added. The reaction can be stopped in a known manner, for example with ethanol (EtOH). This can also be achieved via a container according to the invention having a bursting pressure difference of 60 bar for example. All reactions in parallel methods can thus be stopped simultaneously, without having to open all reactors.

It is clear from these short exemplary explanations alone that it is possible (for the first time) by means of the invention for even complex reactions to be carried out in such a way that all reagents can be added into the reactors in their own containers before the onset of the reactions in such a way that the reactions can then be carried out practically without manipulation at the reactor itself in a program-controlled manner, and, in parallel synthesis, without the slightest of scheduling problems.

With the method according to the invention, containers are preferably used that are designed such that they break open at an external pressure that is higher than their respective internal pressure at least by the specified bursting pressure difference, wherein the containers are broken open and the substances located in the containers are therefore released in a pressure-induced manner by deliberate application in the reactor of overpressures matched to the specified bursting pressure differences of the containers. The breaking open of the containers by means of overpressures allows larger pressure ranges and greater pressure intervals than if the containers were broken open by means of negative pressures.

For certain applications, it may be thoroughly advantageous however for a container to release a substance at a specific (external) negative pressure. An example of this is the quality control after the synthesis of a catalyst, which to this end is to be measured in terms of its porosity (key variable of the active surface). As soon as the catalyst comes into contact with residual air or residual moisture, it is generally destroyed immediately and has a surface of a different nature. It is therefore advantageous to hold the catalyst (in a precisely defined quantity) in a container according to the invention, where it can remain safe from air and moisture, preferably under a protective gas atmosphere, until the quality test. The porosity measurement is based in many cases on a cyclical application of vacuum and nitrogen, wherein the amount of nitrogen molecules that can be absorbed by the catalyst is measured. For this application, it is ideal if the container is not broken open by external overpressure, but if the container bursts precisely with the first application of a vacuum impact and thus releases the catalyst.

In accordance with an advantageous embodiment, two or more identical or different substances are present in separate containers with different bursting pressure differences and are released selectively from the respective containers by means of deliberate application in the reactor of pressure differences adapted to the different bursting pressure differences.

Of course, the simultaneous metered addition of different substances which, for whatever reasons, are present or must be present in separate containers is also possible. In this case, the containers in question must of course be designed for the same bursting pressure difference.

Precisely defined substance mixtures may also be present in the containers, such as solutions or simple suspensions.

Each of the substances to be metered can advantageously also be present in two or more containers, each with predefined, possibly different substance quantities preferably measured based on mole equivalents, wherein the containers containing the same substance then all have the same bursting pressure difference. This has the advantage that the dosing quantity of these substances can be set very easily by combination of matching substance containers, as is described fundamentally in detail in document WO 02/13969 A1 cited in the introduction. The present invention therefore to a certain extent creates an extension of the "third dimension" in addition to the two "dimensions" of substance type and substance quantity.

The course of the reaction is advantageously controlled by means of pressure-induced, selective breaking open of the container or of the containers and resultant selective release of the substance or substances located in the container or in the containers. This has the advantage of a low complexity of the equipment required and creates the possibility of simultaneously releasing one or even more substances, for example in the case of parallel synthesis in all reactors, without each reactor having to comprise for example a substance pump having the significant aforementioned limitations.

Here, all substances necessary for the reaction, if need be with the exception of reactive gas or reactive solvent, are preferably introduced into the reactor before the start of the reaction, and the substance or substances present in a container or in containers are released in accordance with a reaction plan by breaking open the container or the containers deliberately in a pressure-induced manner. In this way, the reactor no longer has to be opened and it is possible to dispense with complex measures and equipment for introduction for the substances during the course of the reaction.

Containers with graduated bursting pressure differences in the region from a few bar to at most a few hundred bar are preferably used. Bursting pressure differences particularly preferably lie in the ranges from 1-10 bar, 10-30 bar, 30-70 bar and 70-100 or 70-200 bar. The accuracy of the bursting pressure differences preferably lies in the range of 0.2-5 bar. As a result of bursting pressure differences of the containers arranged sufficiently wide apart, it can be ensured that the respective containers are broken open deliberately and selectively.

The method according to the invention is particularly well suited for such reactions where particularly highly sensitive substances, in particular catalysts, specifically homogeneous or heterogeneous catalysts, have to be metered. The method according to the invention is preferably used to carry out polyolefin synthesis reactions or synthesis methods using similar reaction techniques. The method is also advantageous for hydrogenation. The substances metered by means of the containers however may also be starting materials, starters, accelerators, co-catalysts, inhibitors, etc., for example.

Further preferred reactions within the scope of the method according to the invention are peptide syntheses, solid-phase reactions, in particular solid-phase syntheses or reactions with solid-bed reactors, solid-phase/gas-phase reactions and also analysis reactions, in particular in high purity analysis.

In accordance with an advantageous embodiment of the method according to the invention, the chemical reaction is carried out in a flow reactor with gaseous or liquid reaction medium.

A further advantageous embodiment of the method according to the invention lies in the fact that the chemical reaction is carried out as a plurality of parallel reactions, in particular parallel syntheses, and/or in the Split & Pool method.

The method according to the invention is particularly well suited for parallel synthesis. Not only because the parallel reactions here can be "remote-controlled" or not only because this is more comfortable with corresponding substance libraries present, and also not only because the automation is therefore simpler, but particularly the method according to the invention for parallel synthesis and generally for parallel experiments, where the method according to the invention can be applied, fully solves the problem of scheduling by actually eliminating it. Therefore, the method according to the invention can encourage the breakthrough of parallel experimentation since it practically fully eliminates one of the most important and most difficult problems. This is a particularly important advantage of the method according to the invention.

In accordance with a preferred variant of the method according to the invention, at least one container arranged within a casing container is used, wherein the casing container is formed so as to be at least partially gas-permeable and/or liquid-permeable and is more stable relative to the container, such that it is not destroyed itself when the container located therein is broken open in a pressure-induced manner. The outer container may even possibly be "packed" in a further outer container. Here, "more stable" means that the casing container can withstand higher pressures or pressure differences than the container located therein. Normally, the outer container has thicker walls to this effect. Since it is not completely closed and a pressure compensation may therefore take place, a design that is "weaker" or that has thinner walls per se is also thoroughly sufficient for the increased stability. With this method variant, the fragments produced when the container is broken up are retained in the casing container. The substance is transferred for example in dissolved form into the reaction mass.

If the substance located in the container is a solid reaction carrier, this variant has the further advantage that the reaction carrier remains in the casing container and the reaction takes place within the casing container.

In accordance with a particularly advantageous embodiment of the method according to the invention, two or more containers each arranged within a casing container and containing different solid substances are used, wherein identical or different reactions or partial reactions take place within the individual casing containers depending on the substance.

In the case of polyolefin synthesis, the task of the catalyst is to incorporate dissolved ethylene molecules into the polymer to be formed. Since the catalyst cannot pass the glass frit (or the like) of the casing container, the growing polymer remains "captured" in the casing container. For example, a plurality of such casing containers can thus also be used simultaneously in one reaction vessel under exactly identical conditions. This allows not only practically absolute comparability as an advantage, but enables the use of such containers according to the invention in what are known as "Split & Pool methods", for example in solid phase synthesis or (with use of average peptides as starting material) also liquid phase synthesis of peptides or in solid phase synthesis in general. What are known as scavenger reagents can also be used similarly. A container according to the invention with a casing container opens up completely new possibilities with regard to throughput and comparative quality in the research and development of new catalysts, substances or active ingredients.

If, in the inner container, a substance that is dissolvable in the reaction medium is present, the permeability of the frit or generally of a membrane can also be fashioned or designed in such a way that the substance can be added to the reaction mixture not all at once, but over a specific period of time.

Furthermore, containers encased in this way can be used directly in what are known as flow reactors, equipped accordingly with an addition chamber, in such a way that a specific catalyst setup for example is in the container, which breaks open for example at 10 bar. This container provided with a casing container is then introduced into the addition chamber of the flow reactor (for example through a door thereof), wherein the reaction flow for example with the molecule that is to be changed in the phase that flows through the casing container causes the (inner) container to burst from a pressure of 10 bar, the catalyst setup to thus be released and be available for the reaction, without the catalyst coming into contact outside the reaction chamber with any other atmosphere.

The concept according to the invention of the use of substance containers with specified bursting pressure differences allows a further advantageous development, with which at least one container is additionally used that contains a substance, which stops the chemical reaction, wherein the specified bursting pressure difference of this container is higher than the specified bursting pressure difference of all other containers used, but is smaller than or is at least not greater than a maximum pressure permissible for the respective reaction conditions. Here, the permissible maximum pressure is generally given by the nature or construction of the reactor. If the pressure in the reactor comes close to the permissible maximum pressure, for example in the case of unexpectedly exothermic "run-away" reactions during research, the container breaks open and the substance thus released stops the chemical reaction completely. This container containing a reaction-stopping substance forms a simple, yet highly effective safety measure, which can of course also be used in conjunction with other reaction methods. The container containing the substance in question thus forms a reactor-internal "rupture disc" to a certain extent and is preferably also equipped with a gas-absorbing effect. The internal "bursting disc" has the further advantage compared to the conventional external rupture discs, which quickly release the pressure outwardly and can be used in parallel as additional safety measures, that dangerous reagents for example cannot be released into the surrounding environment, not even into the chimney, and an additional safety measure is arranged upstream. Furthermore, no rupture disc has to be replaced after an acute situation.

Further advantageous uses of the container are in the field of porosity and surface measurement, surface analytical examinations, particle size distribution measurements, microscopic examinations and also storage.

The containers according to the invention are preferably formed such that their specified bursting pressure differences lie in a range relevant for practice of 1-10 bar, 10-30 bar, 30-70 bar, 70-100 bar or 100-200 bar with an accuracy (tolerance) of preferably 0.2-5 bar. Here, as already mentioned, the specified bursting pressure difference is preferably determined by material selection, wall thickness, shaping and/or by the formation and arrangement of predetermined breaking points.

In accordance with an advantageous development, the container is arranged within a casing container, wherein the casing container is at least partially gas-permeable and/or liquid-permeable and is also formed such that it is not destroyed itself when the container located therein is broken open in a pressure-induced manner. Here, the casing container is particularly preferably equipped with at least one frit or a functionally equivalent element.

The casing container is particularly preferably equipped with at least one additional chamber, which contains a further chemical substance, is in gas and/or liquid communication via a frit or a functionally equivalent element with a chamber containing the container, and is designed for a specified bursting pressure difference between the internal pressure and the pressure outside the casing container, such that it breaks open under pressure conditions that exceed the specified bursting pressure difference and releases the substance contained therein.

An advantage of a container equipped with frits or the like is that the space between the frits is likewise closed in an air-tight manner and/or may contain a further substance, which is located between the frits and the inner container. This substance may be a co-catalyst for example.

Information concerning the specified bursting pressure difference is advantageously assigned to the container, in particular by means of a marking, specifically in the form of a code or in the form of plain text, either on the container itself or on or in a container packaging.

The set according to the invention preferably comprises containers with different substances, wherein these containers are designed for identical and/or different bursting pressure differences. In the case of different bursting pressure differences, the containers are formed for preferably at least three different bursting pressure differences.

The set may advantageously also comprise containers with identical substances, wherein these containers are designed for different and/or identical bursting pressure differences. In the case of different bursting pressure differences, the containers are designed for preferably at least three different bursting pressure differences.

The set most preferably comprises containers with quantities of identical substances graduated in accordance with the quantity, preferably based on mole equivalents.

It is particularly advantageous if the set comprises a plurality of containers that differ in terms of their specified bursting pressure difference and/or by the substances contained therein and/or by the quantities of the substances contained therein. Here, two or more containers with identical content, identical substance quantity and identical bursting pressure difference may advantageously also be provided.

It is also particularly advantageous if the set comprises a plurality of containers with at least three, preferably at least four, different substance filling quantity graduations.

The containers preferably have bursting pressure differences in the range from a few bar to at most a few hundred bar. At least one of the containers is preferably designed for a bursting pressure difference in the range of 1-10 bar. Alternatively or additionally, at least one container is designed for a bursting pressure difference in the range of 10-30 bar. Alternatively or additionally, at least one container is also designed for a bursting pressure difference in the range 30-70 bar. Alternatively or additionally, at least one container is also designed for a bursting pressure difference greater than 70 bar. The tolerances for the bursting pressure differences are preferably in this case in the range of 0.2-5 bar.

In accordance with an expedient embodiment, two or more containers with different specified bursting pressure differences are arranged so as to be nested one inside the other. Space can thus be saved in some situations, in particular in conjunction with relatively small reactors. An inner container can also be designed such that it bursts before the outer container and releases the substance within the outer container, which is still closed, and the substance reacts with the substance in the outer container before the product is released into the reaction mixture in the reactor as a result of the fact that the outer container is broken open (for example isolated in situ formation of catalysts or intermediates, without the reaction having to take place in the reaction medium and without the reactor having to be opened in this regard).

In accordance with a preferred development, the containers of the set according to the invention containing a substance, or some of said containers, are each arranged within a casing container, wherein the casing containers are more stable than the containers and are at least partially gas-permeable and liquid-permeable. Here, the casing containers are advantageously equipped with a frit or a functionally equivalent element. The advantages of such containers with casing containers have already been explained in conjunction with the casing containers themselves.

It is also particularly advantageous if the containers of the set are assigned information concerning their specified bursting pressure difference, in particular by means of a marking, specifically in the form of a code or in the form of plain text, either on the containers themselves or on or in a container packaging.

A container of the type according to the invention described above can also be used in accordance with a further aspect of the invention to interrupt a chemical reaction taking place in a reactor, wherein the container located in the reactor during the reaction contains a substance stopping the reaction and the container is designed for a specified bursting pressure, which is not greater than a maximum pressure permissible for the respective reaction conditions.

BRIEF DESCRIPTION OF THE DRAWINGS

The invention will be described in greater detail hereinafter with reference to the accompanying drawings and on the basis of various exemplary embodiments. In the drawings:

FIGS. 4a-g show simplified views of seven different embodiments of containers according to the invention containing a substance, FIGS. 6a-c show sectional illustrations of three further modified embodiments of containers according to the invention.

DESCRIPTION OF THE INVENTION

The following definition applies for the description below: if reference signs are specified in a figure for the purposes of clarifying the drawings, but are not mentioned in the part of the description related directly thereto, reference is made to the explanation of said reference signs in the preceding or subsequent parts of the description. Conversely, in order to avoid an overload of the drawings for immediate comprehension, reference signs of lesser relevance are not shown in all figures. To this end, reference is made to the other figures.

Figures 1, 2:
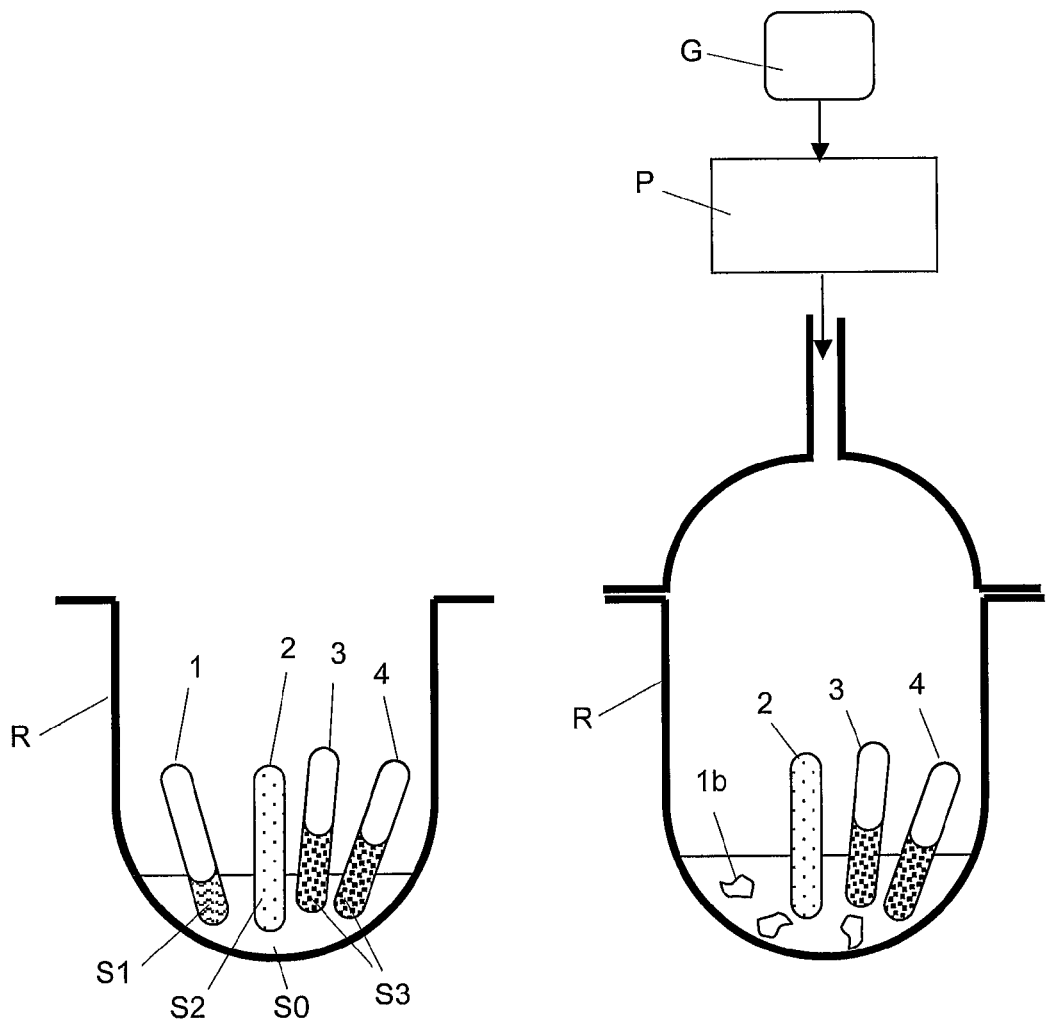
FIG. 1 shows a schematic illustration of an exemplary reactor that is open with four containers located therein, each containing a substance and still sealed in the gas-tight state.
FIG. 2 shows a schematic illustration of the reactor in the closed state with containers located therein, one of said containers having already burst as a result of an application of pressure and having released the substance located therein.

A conventionally introduced liquid substance S0 and four containers 1-4 still closed in a gas-tight manner for the time being are located in an exemplary reactor R illustrated in the open state in FIG. 1, wherein the container 1 for example contains a liquid substance S1, the container 2 contains a gaseous substance S2, and the containers 3 and 4 each contain a solid substance S3. The substance in containers 3 and 4 is the same, but is provided in different (or the same) quantities. The volume parts of the containers 2-4 not occupied by the respective substance S2 or S3 are filled with an inert gas or with a gas or gas mixture that is otherwise compatible with the reaction to be carried out. Instead of just one container, a plurality of containers 1-4 can also be used for each of the three substances S1-S3, said containers together containing the substance quantity required for the reaction to be carried out. The solid, liquid and/or gaseous substances are the starting materials for the reaction to be carried out and also catalysts, starters, accelerators and/or inhibitors where necessary. The substance S0 may also have been introduced in one or more separate containers, which has/have been broken open in any way (for example also under a specific pressure) upon introduction into the reactor R or immediately thereafter. This will not be discussed in greater detail here. The substance S0 can also be omitted completely depending on the reaction to be carried out, that is to say that all substances necessary for the reaction are present at the start in containers that are initially still closed. Furthermore, a gas can also be applied and the reaction can be carried out therein, and the gas may for example even itself be a further component required for the reaction (for example propylene gas in polyolefin syntheses).

Containers 1-4 consist of a reaction-inert material, typically glass. The containers are produced, filled with substance and closed so as to be gas-tight in a manner known per se for example as is described in detail in the document WO 02/13969 A1 cited in the introduction. A laser device is preferably used to melt containers having very thin walls.

The containers 1-4 are designed by the manufacturer for different specified bursting pressure differences by means of a suitable material selection, dimensioning of the wall thicknesses, shaping and, where necessary, also by predetermined breaking points. That which is to be understood by this has already been discussed in detail further above.

Once the reactor is closed, as illustrated in FIG. 2, it is acted on by a gas or gas mixture suitable or required for the reaction to be carried out. The gas or gas mixture is fed in a manner known per se by means of a preferably computer-controlled pressure controller P from a gas storage container G.

Alternatively, if the reaction allows or even requires, the temperature can also be increased. The pressure is likewise increased continuously, for example by means of evaporating solvent, and is controlled relatively accurately via the temperature/pressure curve.

A pressure state (overpressure), which is sufficient to selectively cause the container (or the containers) having the lowest specified bursting pressure difference to burst, the other containers with higher bursting pressure differences not being damaged however during this process, is then produced deliberately in the reactor by means of the pressure controller P, either immediately at the start or at another desired moment in time, for example predefined by a reaction plan. In FIG. 2, the container 1 has been broken open in this way and the substance S1 contained therein released. The fragments of the container produced when the container 1 breaks open (bursts) are denoted in FIG. 2 by 1b.

Figure 3:
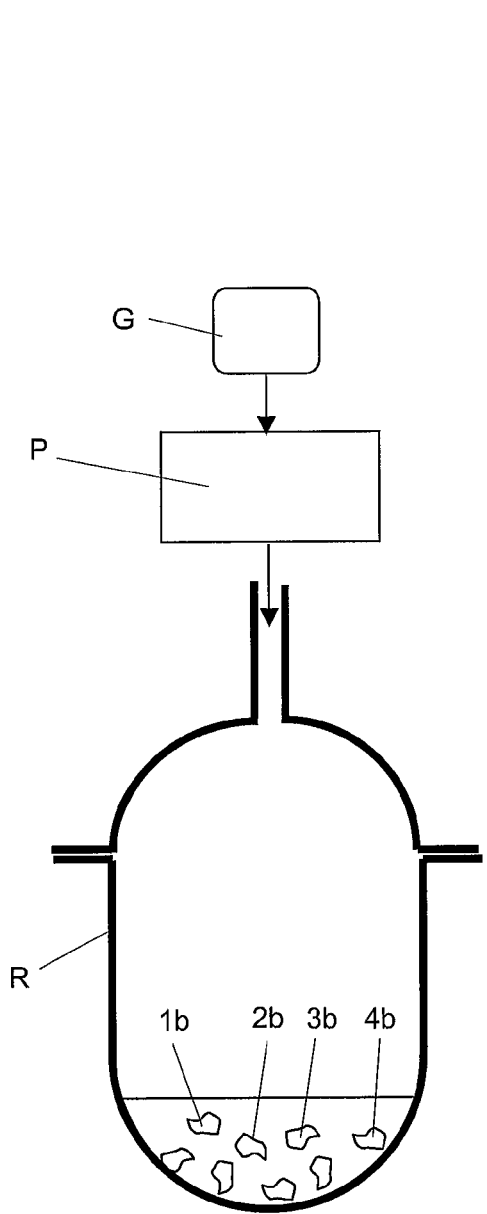
FIG. 3 shows a schematic illustration of the closed reactor with containers located therein, which have already all burst at a pressure greater compared to FIG. 2 and which have released the substances located therein.

As the course of the reaction continues, the remaining containers are also broken open in the same way, gradually and selectively by deliberate application of pressure of sufficient magnitude, and the substances located therein are released, such that they can take part in the reaction or can influence the reaction. The end state is illustrated in FIG. 3, in which all containers have been broken open. The fragments of containers 1-4 are denoted here by 1b, 2b, 3b and 4b.

A representative example of a reaction carried out in accordance with the method according to the invention is a polyolefin synthesis with the following reaction control, wherein the reactor no longer has to be opened during the reaction and no further reagent or other substance apart from the pressure application necessary in any case, for example with ethylene gas (first monomer), has to be added:

Step 1: the reactor is charged with 6 containers, of which the first two with the same first bursting pressure difference contain a co-catalyst (for example x mg or x*0.6 mg MAO), a third and a fourth container likewise with the same second (higher) bursting pressure difference contain a (primary) catalyst (for example x mg or x*0.2 mg), a fifth container with a yet higher third bursting pressure difference contains a second monomer (for example butadiene, in addition to the first monomer ethylene gas), and a sixth container again with a yet higher fourth bursting pressure difference contains a quenching substance (for example x*10 mg EtOH). (Here, the factor x is any number).

Step 2: the reactor is acted on by the first monomer ethylene gas and the pressure is set for example to 10 bar.

Step 3: the two first containers break open under the pressure of 10 bar and release the co-catalyst MAO into the reactor.

Step 4: waiting for 2 minutes.

Step 5: the pressure is increased to approximately 30 bar.

Step 6: the third and the fourth container break open under the pressure of 30 bar and release the (primary) catalyst.

Step 7: waiting for 5 minutes until the active catalyst (catalyst+co-catalyst) has formed.

Step 8: the pressure is temporarily increased for 1 minute to approximately 45 bar.

Step 9: the fifth container with the second monomer in a precisely determined, discrete quantity breaks open under the temporarily increased pressure of 45 bar and releases said second monomer into the reactor.

Step 10: the pressure is reduced to 30 bar.

Step 11: waiting for 60 minutes.

Step 12: the pressure is temporarily increased to approximately 60 bar for approximately 1 minute.

Step 13: the sixth container breaks open as a result of the pressure increased to 60 bar and releases the quenching substance contained therein. As a result, the reaction taking place is aborted ("quenched") practically in an instant.

Step 14: the pressure is reduced to ambient pressure and the method is continued in accordance with the standard procedure known per se.

Figure 7:
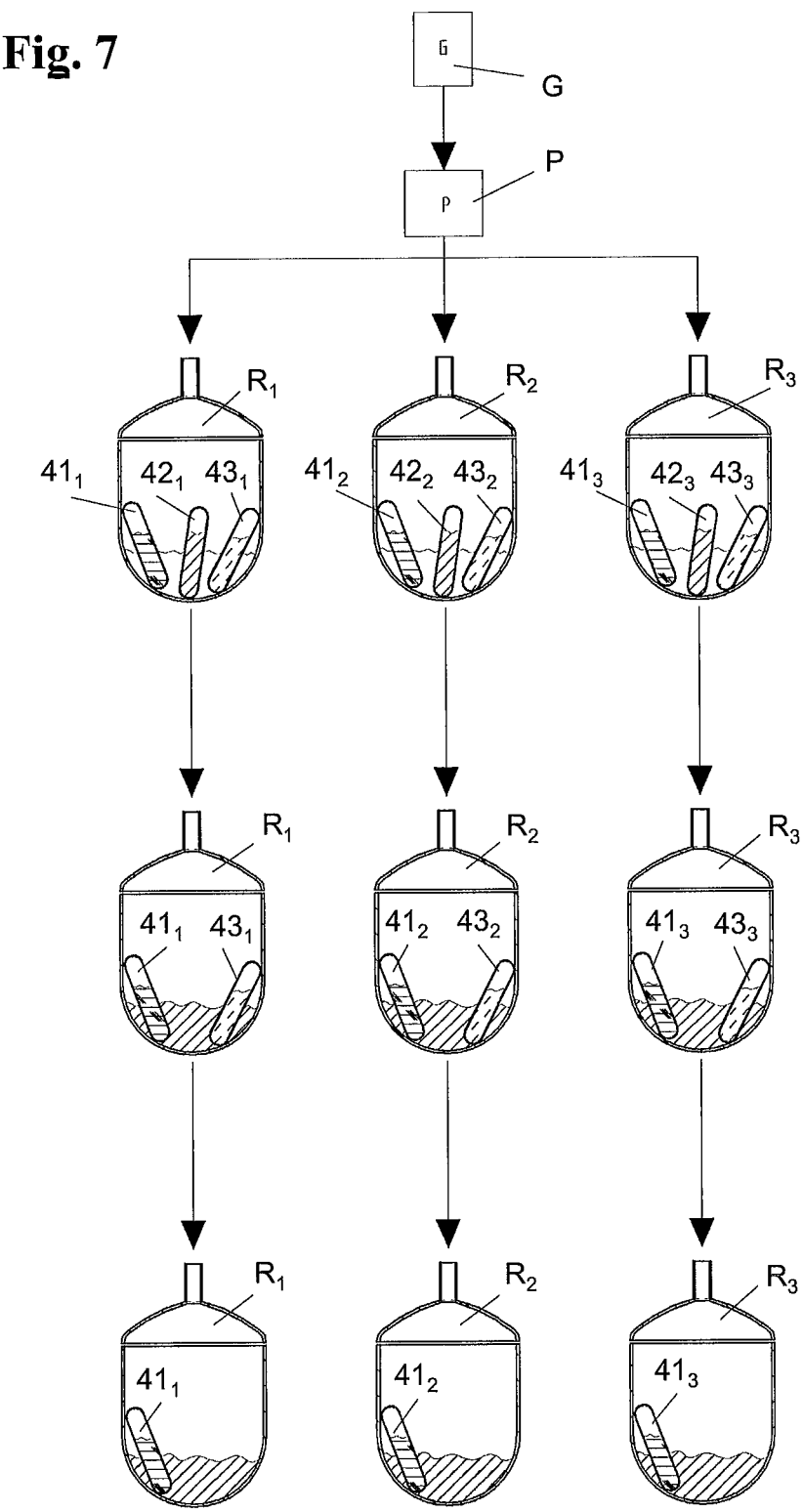
FIG. 7 shows a simplified schema for illustrating a parallel reaction.

FIG. 7 schematically illustrates an exemplary parallel reaction with use of three reactors, which are denoted by $R_1$, $R_2$ and $R_3$. Similarly to the example in FIGS. 1-3, the three reactors are acted on by reaction gas from a common gas source G, wherein the pressure of the reaction gas is controlled jointly by a pressure controller P for all three reactors. The same pressure conditions thus prevail in the three reactors.

Similarly to the example in FIGS. 1-3, the reactors are initially charged (here for example) with three containers $41_1$, $42_1$, $43_1$ or $41_2$, $42_2$, $43_2$ or $43_1$, $43_2$, $43_3$ containing a substance (see the uppermost row of reactors). The pressure is then increased at a specific moment in time in all three reactors until one of the three containers breaks open in each case and releases into the reactor the substance contained therein (illustrated in the middle row of reactors). In a subsequent step, the pressure in all three reactors is again increased until a second of the three containers breaks open in each case (illustrated in the lowermost row of reactors). This procedure is continued until all containers have been broken open and the substances contained therein have been released.

The advantages already described further above when carrying out parallel reactions are immediately evident. The scheduling problem is eliminated, since all reactors can be charged with substance containers already before the reactions, and the reactions can then be controlled easily in equal measure (by central pressure control) in all reactors, either at the same time or individually.

FIGS. 4a-4g show various possible embodiments of containers 11-17 containing substances. For practical reasons, the containers are generally elongate (FIGS. 4a-4d and 4f-4g), but may also be spherical (FIG. 4e). The container 11 in FIG. 4a is cylindrical with two rounded ends. The container 12 in FIG. 4b is likewise cylindrical, but has a rounded end and a flat end. The container 13 in FIG. 4c is cylindrical with two flat ends or is rectangular with six planar walls. The container 14 in FIG. 4d is conical or pyramidal. The container 15 in FIG. 4e is spherical. The common feature of all containers 11-15 in FIGS. 4a-4e is that they have a substantially constant or homogeneous wall thickness, which also determines their bursting pressure difference, wherein shapes with flat wall parts or sharp edges with otherwise constant structure of the walls generally have a lower bursting pressure difference than shapes with round surfaces and rounded ends. This enables different bursting pressure differences to be implemented in a simple manner. Depending on the desired specified bursting pressure difference, typical wall thicknesses range from 0.03 mm to approximately 2 mm, wherein (with the construction material glass) a bursting pressure difference range from a few bar up to more than 100-150 bar and possibly even higher may be covered. Here, the size of the containers compared to the wall thickness also plays a role. With larger containers, the wall thickness for higher bursting pressure differences may be several mm. A typical container with a bursting pressure difference of approximately 6 bar has the design according to FIG. 4a, is in this case approximately 50 mm long, approximately 10 mm thick and has a wall thickness of approximately 0.05 mm.

FIGS. 4f and 4g show two alternative containers 16 and 17 with larger wall thicknesses (approximately 0.2 mm), which are provided with one predetermined breaking point 16s (FIG. 4f) and a plurality of predetermined breaking points 17s (FIG. 4g). Without predetermined breaking points, these containers would break at pressure differences in the region of >100 bar. However, the predetermined breaking points are designed such that the containers already burst at substantially lower overpressures, for example of approximately 10 bar. Of course, any other, higher or lower bursting pressure difference can be set by means of a suitable design of the predetermined breaking points. The container 16 provided with just one centrally arranged predetermined breaking point 16s normally breaks into two halves. With a number of predetermined breaking points, as with container 17 in FIG. 4g, smaller fragments are produced with no cavities or no significant cavities, so that a substance is fed quickly or very quickly to the reaction medium when the container bursts. On the other hand, more or less temporary concentrations thus occur.

Figure 5A:
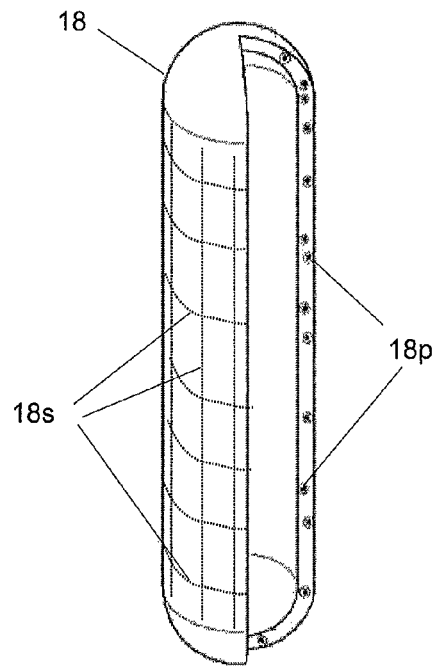
FIGS. 5a-c show views of three further embodiments of containers according to the invention.

FIG. 5a shows a specifically designed container 18. Externally, the container 18 has a similar design to the containers 16 and 17 in FIGS. 4f and 4g and also has predetermined breaking lines 18s. However, glass-encased steel pearls 18p are fused into the slightly thicker container wall and are distributed such that, once the container has burst, at least one (glass-encased) steel pearl is present in each fragment. The fragments can thus be removed easily from the reaction mass by means of a magnet, the filtration process that is otherwise conventional being eliminated.

Figure 5B:
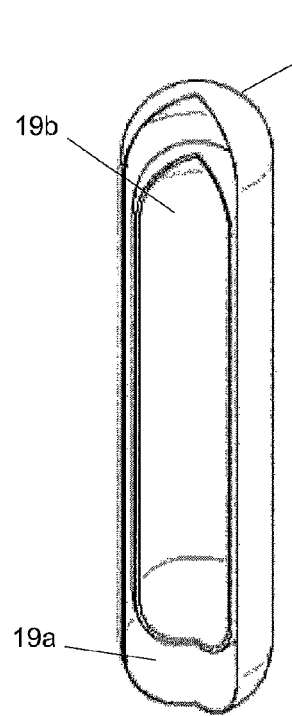
Figure 5C:
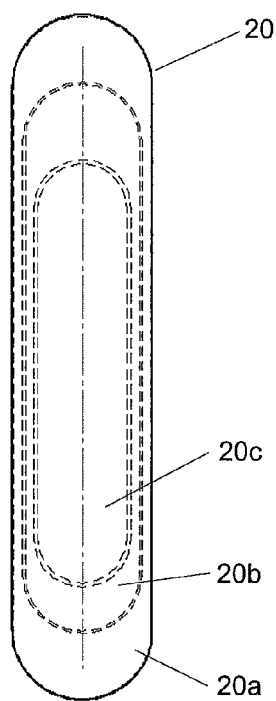

In the case of the containers 19 and 20 illustrated in FIGS. 5b and 5c, two and three containers 19a and 19b, and 20a, 20b and 20c are illustrated respectively, nested one inside the other, wherein the individual containers each contain different substances and are also each designed for different bursting pressure differences, such that the individual containers can also be broken open selectively in these variants. In FIG. 5c, the innermost container 20c for example has the greatest wall thickness and the outermost container 20a has the lowest wall thickness. Of course, these containers may also be formed with predetermined breaking points.

FIGS. 6a and 6b show a further important modification of a substance container according to the invention. In this case, the actual container 21 or 22 containing the substance is arranged within a casing container 31 or 32. The casing container 31 or 32 is designed in terms of its stability such that, when the container 21 located therein is broken open in a pressure-induced manner, it is not destroyed itself. The casing container 31 or 32 is thus more stable than the container 21 or 22 located therein, that is to say it can withstand higher pressures compared to the relevant container 21 or 22, or withstands practically any pressure, because it is open and a pressure compensation can thus take place. As a result, the casing container (with sufficient stability) remains intact when the container located therein is broken open in a pressure-induced manner. The casing container 31 or 32 is gas-permeable and/or liquid-permeable in some regions. This can be implemented for example by a frit 31f or two integrated frits 32f. Instead of frits, functionally equivalent elements, such as a membrane, may also be provided, which allow an exchange of gas and/or liquid, but retain solid particles (exceeding a specific size), but also allow suspended solids below a specific size (for example nanoparticles) to pass through.

The use of such substance containers has the advantage that, once the inner containers containing the substances have been destroyed in a pressure-induced manner, the fragments of said containers are retained in the casing container and can thus be removed easily from the reaction mass, such that an otherwise necessary filtration or other separation of the fragments is eliminated. Here, the substance, which is soluble or suspended in fine particles, is supplied through the frit to the reaction medium (and if need be vice versa).

With substance containers equipped with diaphragms, noble metal catalysis processes can be carried out, wherein the product is not contaminated by the noble metal, and the noble metal can be easily recovered.

If the inner containers contain a solid reaction carrier as a substance, yet a further advantage is provided in as much as the reaction then takes place within the casing container, that is to say virtually in a chemical cell. In the Split & Pool method, as already mentioned further above, dozens or hundreds of catalysts can thus be tested for example or dozens or hundreds of peptides can be synthesised for example. Here, the casing container is preferably provided with an engraved barcode, which provides information regarding the substances contained.

A modification of a substance container similar to FIGS. 6a and 6b is illustrated in FIG. 6c, in which the casing container 33 is closed on all sides. The casing container 33 comprises a central cylindrical portion 33c and two dome-shaped end portions 33a and 33b. Two frits (or functionally equivalent elements) 33f, which divide the interior of the casing container into three chambers, which are in gas and/or liquid communication via the frits, are located at the two ends of the central portion. The chamber formed by the central portion 33c receives a container 23 that can be broken open by means of deliberate pressure application. In each of the two chambers formed by the dome-shaped portions 33a and 33b a further substance S5 or S6, respectively, is located, which reacts with the substance S7 located in the inner container 23 when said substance S7 is released as the inner container is broken open in a pressure-induced manner, without contact with the reaction medium in the reactor. This substance container thus forms a de facto independent (sub-) reactor. By use of a plurality of such sub-reactors with different contents, different reactions can be carried out in parallel, more specifically for example all together in a correspondingly large reactor. Split & Pool reactions can thus be carried out in a thoroughly new manner and for thoroughly new reactions. The casing container 33 is also designed such that the two dome-shaped end portions 33a and 33b can be broken open by means of pressure application, similarly to the inner container 23, wherein the central portion 33c of the casing container (together with the frits 33f) remains intact however. It is then possible for the reaction mixture produced in the casing container to mix with the reaction mixture in the reactor, as is the case for example with the container in FIG. 6b.

In a further modification, two or more substance containers may also be arranged within common casing containers.

Figure 8:
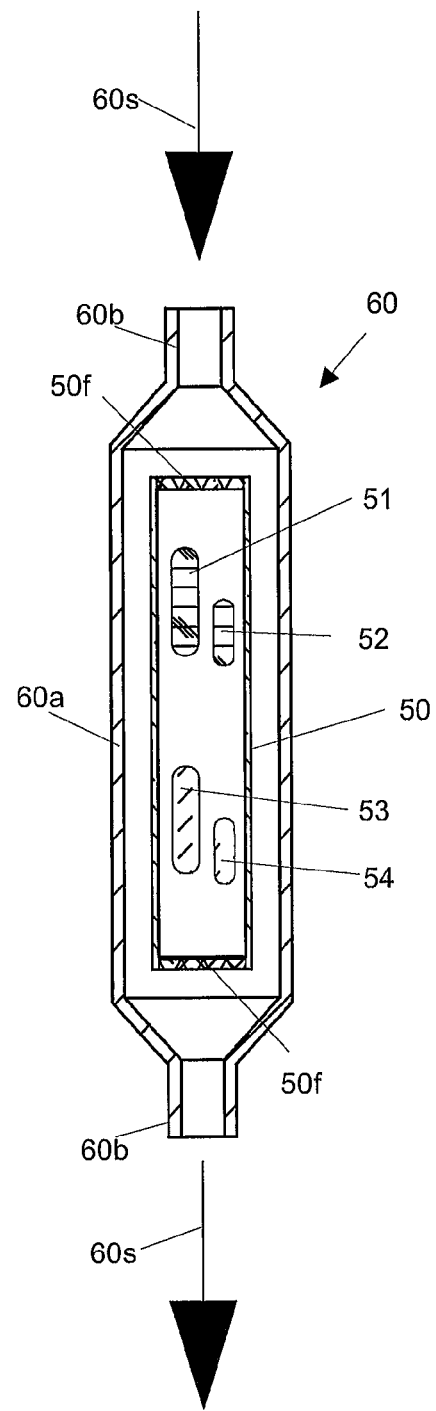
FIG. 8 shows a basic sectional illustration of a flow reactor.

A container equipped with a casing container similarly to that in FIG. 6b can be used particularly advantageously to carry out reactions in a flow reactor, as is illustrated schematically by way of example with reference to FIG. 8.

A flow reactor denoted as a whole by 60 comprises a substantially tubular reaction chamber 60a, which is looped via two line connections 60b into a reaction gas flow symbolised by arrows 60s. A casing container 50, which is cylindrical for example and is closed at its two ends for example by frits 50f, such that reaction gas can flow through it, is located in the reaction chamber 60a. The casing container 50 has been introduced into the reaction chamber 60a through an access opening (not illustrated here) in said reaction chamber.

Here, four containers 51-54 for example, each with a chemical substance, for example a reaction carrier or catalyst or co-catalyst, are located inside the casing container 50. Depending on the reaction to be carried out, the containers 51-54 are broken open at the same time or at different moments in time by means of one or more pressure surges or generally by means of a pressure increase of the reaction gas, and the reaction is thus initiated or influenced. The reaction product remains in the casing container 50, which is then removed again from the reaction chamber 60a at a given time.

Figure 9:
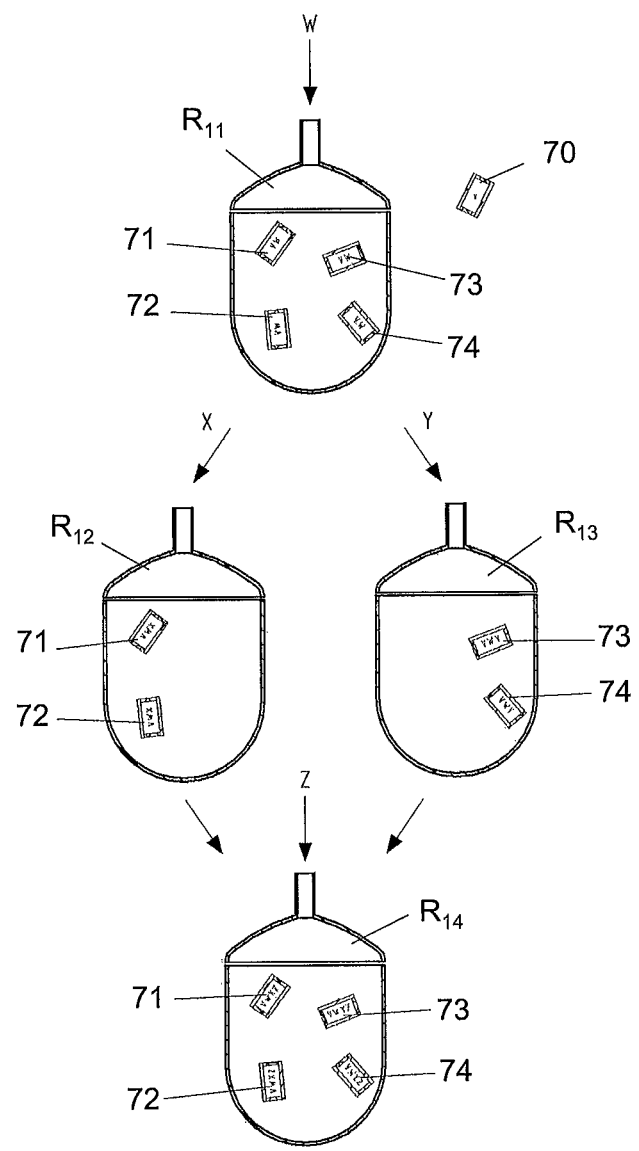
FIG. 9 shows a simplified schema for explaining a Split & Pool method.

FIG. 9 illustrates schematically a simple example of what is known as a Split & Pool method, in which casing containers of the previously described type are used as chemical cells.

Here (in this example), four reactors $R_{11}$, $R_{12}$, $R_{13}$ and $R_{14}$ are used. For example, four casing containers 71-74 similar to the casing container 50 shown in FIG. 8 with one or more substance containers, which are illustrated here in the state already broken open, are located in the first reactor $R_{11}$. A substance W is fed to the reactor. Before the reaction with the substance W, a forming polymer for example, which (inter alia) contains molecules V, is located in the casing containers 71-74. Such an individual casing container is illustrated separately in FIG. 9 and is denoted by 70. Due to the reaction in the reactor $R_{11}$, a molecule W is incorporated into the polymer, such that the polymers in the casing containers 71-74 ultimately contain all molecules V and W.

In the next step, the four casing containers 71-74 are divided between the two reactors $R_{12}$ and $R_{13}$, wherein the casing containers 71 and 72 are introduced into the rector $R_{12}$ and the casing containers 73 and 74 are introduced into the reactor $R_{13}$. Different substances X and Y are supplied to the two reactors and are incorporated into the polymers in the respective casing containers 71-72 and 73-74, such that the casing containers 71-72 ultimately contain polymers with the molecules V, W and X and the casing containers 73-74 ultimately contain polymers with the molecules V, W and Y. The division of the casing containers between the two reactors $R_{12}$ and $R_{13}$ (or generally a plurality of reactors) is generally referred to as splitting.

In the next step, the casing containers 71-74 are again combined in a single reactor $R_{14}$ ("pooling"), which may of course be physically identical to one of the other reactors, for example the reactor $R_{11}$. This reactor is charged with a further substance Z, wherein polymers with the molecules V, W, X and Z are ultimately formed in the casing containers 71-72, and polymers with the molecules V, W, Y and Z are ultimately formed in the casing containers 73-74.

Of course (as is known per se with Split & Pool methods), the casing containers can be divided and combined in a varied manner as desired, wherein practically any number of casing containers and practically any number of reactors can also be used.

Figure 10:
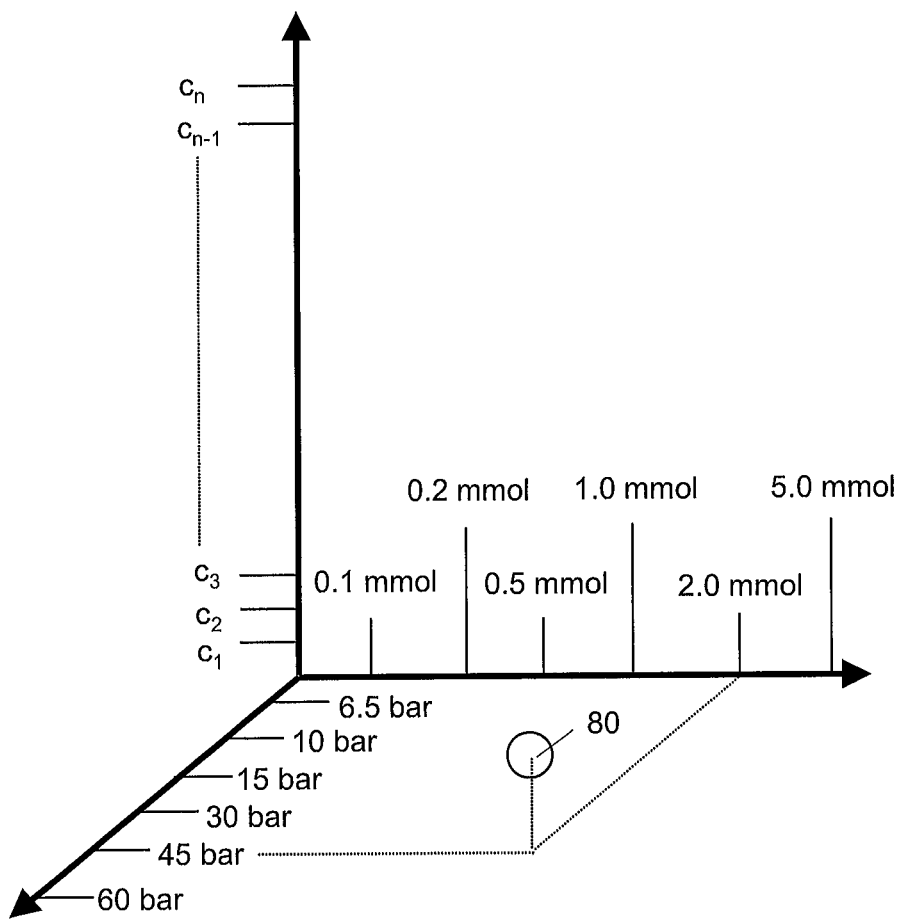
FIG. 10 shows a sketch explaining a set of containers according to the invention.

As already mentioned, a particularly important aspect of the invention lies in the provision of sets of containers containing substances. Such sets can also be referred to as a "substance library". These sets may comprise different containers depending on the intended purpose (reactions to be carried out). Here, "different" means that the containers may vary in terms of the substances contained therein, in terms of the substance quantities, and in terms of the bursting pressure differences for which they are designed, as is illustrated in FIG. 10 in the form of a graph. Here, the number of identical containers can also be seen to a certain extent as a fourth dimension or fourth degree of freedom.

FIG. 10 symbolises a set, of which the containers are filled with n different substances $c_1 \ldots c_n$, wherein the respective filled quantities are graduated based on mole equivalents from 0.1 mmol . . . 5.0 mmol and the bursting pressure differences range from 6.5 bar . . . 60 bar. The illustrated quantity and pressure values are of course to be understood purely by way of example. As a specific example, a container 80 is illustrated, which contains a measured quantity of 2.0 mmol of the substance $c_3$ and is designed for a bursting pressure difference of 45 bar. The possibility that individual, some, or all containers in the sets can be provided twice or more is not illustrated in the drawing.

Of course, in the set symbolised in FIG. 10, not all possible "coordinate points" (combinations of a specific substance, a specific substance quantity and a specific bursting pressure difference) have to be "occupied" in practice. A specific substance can be present for example in different containers at different filled quantities, but with only one single bursting pressure difference value. For another substance, containers with identical substance quantities, but different bursting pressure difference values can be contained in the set. For yet another substance, containers with, for example, just two different bursting pressure differences and additionally, for example, three different filled quantities can be contained in the set. In the extreme case, a substance may also be represented in the set in just a single container in a single measured quantity and with a single specified bursting pressure difference value of the container.

For practical application, it is advantageous if a set comprises containers with at least 2, better still at least 3, different bursting pressure difference values. Furthermore, it is advantageous in practice if a set contains containers in each case with at least 3, preferably 4 and more, filled quantity graduations, wherein the filled quantities can be graduated both gravimetrically and based on mole equivalents. The number of represented different substances is of course dependent on the reactions for which the set is to be used. Furthermore, it is advantageous in practice if at least 2-3, but preferably a much larger number, of containers are represented in the set, at least for the most frequently used substances and filled quantities.

The invention claimed is:

1. A method for carrying out a chemical reaction by reacting two or more substances in a reactor, in which at least one substance is present in a substantially reaction-inert container that is closed in a gas-tight manner, is introduced into the reactor in this container, and is released from the container by breaking open the container before or during the reaction, wherein a container is used that is designed such that it breaks open when a specified, known bursting pressure difference between the internal pressure and the pressure outside the container is exceeded,
wherein the container is designed such that it breaks open at an external pressure higher than its internal pressure at least by the specified bursting pressure difference, and
wherein the container is broken open and the substance located in the container is therefore released as a result of deliberate application in the reactor of a corresponding overpressure.

2. The method according to claim 1 wherein two or more identical substances are present in separate containers with different bursting pressure differences and are released selectively from the respective containers by deliberate application in the reactor of pressures adapted to the different bursting pressure differences.

3. The method according to claim 1, wherein two or more different substances are present in separate containers with different bursting pressure differences and are released selectively from the respective containers by deliberate application in the reactor of pressures adapted to the different bursting pressure differences.

4. The method according to claim 1, wherein the course of the reaction is controlled by selectively breaking open the container in a pressure-induced manner and by means of the resultant selective release of the substance or substances located in the containers.

5. The method according to claim 1, wherein all substances required for the reaction are introduced into the reactor before the start of the reaction, and wherein the substance or substances present in a container or in containers is or are released in accordance with a reaction plan by deliberately breaking open the container or the containers in a pressure-induced manner.

6. The method according to claim 1, wherein containers with graduated bursting pressure differences in the ranges of 1-10 bar, 10-30 bar, 30-70 bar or 70-200 bar are used.

7. The method according to claim 1, wherein at least one container is additionally used, which contains a substance that stops the chemical reaction, the specified bursting pressure difference of this container being higher than the specified bursting pressure difference of all other containers used, but being smaller than or at least not greater than a maximum pressure permissible for the respective reaction conditions.

8. A container, which is closed in a gas-tight manner and contains a measured quantity of a chemical substance, wherein the container is designed for a specified, known bursting pressure difference between the internal pressure and the pressure outside the container, such that it breaks open at an external pressure higher than its internal pressure at least by the specified bursting pressure difference, and wherein the container is broken open and the substance located in the container is therefore released as a result of deliberate application of a corresponding overpressure, and wherein information regarding the specified bursting pressure difference is assigned to said container.

9. The container according to claim 8, wherein the specified bursting pressure difference is determined by material selection, wall thickness, shaping and/or by predetermined breaking points.

10. The container according to claim 8, wherein the container is arranged within a casing container, and wherein the casing container is at least partially gas-permeable and/or liquid-permeable and is also designed such that it is not destroyed itself when the container located therein is broken open in a pressure-induced manner.

11. The container according to claim 10, wherein the casing container is equipped with at least one frit or a functionally equivalent element.

12. The container according to claim 10, wherein the casing container is equipped with at least one additional chamber containing a further chemical substance, said chamber being in gas communication and/or liquid communication via a fit or a functionally equivalent element with a chamber containing the container and being designed for a specified bursting pressure difference between the internal pressure and the pressure outside the casing container, such that it breaks open under pressure conditions that exceed the specified bursting pressure difference and releases the substance contained therein.

13. The container according to claim 8, wherein the information regarding the specified bursting pressure difference is assigned to said container by means of a marking, specifically in the form of a code or in the form of plain text, either on the container itself or on or in a container packaging.

14. A set of at least two containers according to claim 8.

15. The set according to claim 14, wherein it comprises containers with different substances, these containers being designed for identical and/or different bursting pressure differences.

16. The set according to claim 14, wherein it comprises containers with different substances, these containers being designed for different bursting pressure differences.

17. The set according to claim 14, wherein it comprises containers with identical substances, these containers being designed for different bursting pressure differences.

18. The set according to claim 14, wherein it comprises a plurality of containers, which differ by their specified bursting pressure difference and/or by the substances contained therein and/or by the quantities of the substances contained therein.

19. The set according to claim 14, wherein the information regarding the specified bursting pressure difference is assigned to the containers by means of a marking, specifically in the form of a code or in the form of plain text, either on the containers themselves or on or in a container packaging.

* * * * *

UNITED STATES PATENT AND TRADEMARK OFFICE
CERTIFICATE OF CORRECTION

PATENT NO. : 9,687,800 B2
APPLICATION NO. : 13/883865
DATED : June 27, 2017
INVENTOR(S) : Rolf Gueller et al.

Page 1 of 1

It is certified that error appears in the above-identified patent and that said Letters Patent is hereby corrected as shown below:

In the Claims

Column 20, Line 64, Claim 12, delete "fit" and insert -- frit --

Signed and Sealed this
Third Day of October, 2017

Joseph Matal
*Performing the Functions and Duties of the*
*Under Secretary of Commerce for Intellectual Property and*
*Director of the United States Patent and Trademark Office*